Patented Jan. 12, 1937

2,067,317

UNITED STATES PATENT OFFICE 2,067,317

METHOD OF CONVERTING BARBITURIC ACIDS INTO STABLE AQUEOUS SOLUTIONS

Heinrich Gruber, Schoneberg, near Berlin, Germany

No Drawing. Application June 7, 1932, Serial No. 615,951. In Germany June 18, 1931

20 Claims. (Cl. 167—52)

This invention relates to improvements in stabilizing aqueous solutions of alkali metal salts of barbituric acids and it comprises methods of stabilizing such aqueous solution by dissolving in the aqueous solvent thereof, an agent capable of stabilizing the alkali metal salt against hydrolysis by the aqueous solvent, such agent being sometimes incorporated in the aqueous solvent prior to dissolving the alkali metal salt herein and sometimes introduced into an aqueous solution of an alkali metal salt having the said acid and alkali combined in substantially equi-molecular proportions, and it also comprises the preparations so obtained, said preparations being stable aqueous solutions of alkali metal salts of barbituric acids having the said acid and alkali combined in substantially equi-molecular proportions and containing sufficient stabilizing agent, advantageously a pyrazolone compound or like non-albuminous organic nitrogen compounds, to prevent development of free acid and alkali and to render the solution stable in storage, said solution being suitable for injection; all as more fully hereinafter set forth and as claimed.

It is well known that substituted barbituric acids are generally difficultly soluble in water, some being more insoluble than others. Special methods are necessary to prepare aqueous solutions from such acids. Generally the practice is to convert the acid into a derivative which is soluble in or miscible with water, such as the metal salts or organic derivatives thereof. However, the aqueous solutions of such water-soluble derivatives are not wholly satisfactory for all purposes, for instance, as liquid preparation for injection. In the prior art, it has been well recognized that aqueous solutions for injection into the human body must be carefully controlled to avoid the deleterious secondary effects.

While alkali metal salts are generally water soluble, such salts in aqueous solution become more or less hydrolyzed, the extent of hydrolysis depending upon the particular barbituric acid combined with the alkali metal. When hydrolysis occurs free acid is formed, which being insoluble, usually appears as a precipitate or deposite; a corresponding amount of free alkali being liberated in the solution.

The alkali metal salts of certain barbituric acids, such as the CC substituted acids, readily dissolve in water. But the aqueous solutions obtained are unstable and sooner or later become turbid and deposit insoluble matter. This is particularly so with those compounds wherein the hydrocarbon substituent is a non-cyclic (open chain) group containing at least five carbon atoms. Frequently this decomposition is so spontaneous that it occurs during or shortly after the dissolving of the alkali metal salts of such acids in the water.

To prepare stable solutions of barbituric compounds for medicinal use, various methods and compositions have been proposed to obviate the difficulties mentioned ante. In most of them, organic solvents or other barbituric compounds or both are employed in lieu of an aqueous solution and an alkali metal salt, to avoid the difficulties inherent in the combinations of the latter materials; the advantages of aqueous solutions of alkali metal salts being forfeited to avoid unwanted results. On the other hand, to obtain clear solutions of barbituric acid in dilute aqueous alkali lye, heretofore the practice has been to employ an excess of alkali lye to take all the acid into solution. Such aqueous solutions, while satisfactory for some purposes, are not fully desirable for injection purposes. When freshly prepared, although all the barbituric acid may be dissolved, they naturally contain free alkali, that is, an excess of alkali over the molar amount equivalent to the acid. In this respect, they are less desirable than freshly prepared aqueous solutions of alkali metal salts of barbituric acid, obtained by adding the alkali metal salt to water, although the later solutions deposit insoluble acid on standing.

I have now found that in preparing suitable solutions of barbituric acid compositions, it is not necessary to resort to special organic solvents or special organic derivatives of those acids. That is, I have discovered simple and advantageous means by which the disadvantages of aqueous solutions of alkali metal salts of such acids can be obviated and by which full advantage can be taken of the excellent water solubility and other desirable properties of such alkali metal salts.

I have found that by incorporating certain hydrotropic substances with the aqueous solvent, it is possible to obtain aqueous solutions of said alkali salts which are capable of being diluted with water and which are stable in storage. For this purpose I employ organic nitrogen-containing hydrotropic substances of non-albuminous nature, soluble in water and capable of stabilizing the alkali metal salt against hydrolysis by the aqueous solvent. By employing suitable amounts of these stabilizing agents, such as pyrazolones and like non-albuminous organic nitrogen-containing compounds, any substantial development of free acid and alkali can be prevented. Advantageously the stabilizing agent is employed in the form of an aqueous solution, such solutions of the hydrotropic substances being sometimes employed to dissolve the alkali metal salt of the barbituric acid or to dilute aqueous solutions of such alkali metal salts containing the said acid and alkali combined in substantial equi-molecular proportions, such as a freshly prepared solution in water of the alkali metal salt. The illustrative examples given post set forth typical embodiments of such procedures. Likewise solutions of mixtures of such hydrotropic substances may sometimes be employed. To render the aqueous solutions of said alkali metal salts stable in storage, sufficient of the stabilizing agent is added to prevent hydrolysis of the alkali metal salt; the amount in a given instance depending upon the particular hydrotropic substance used. Usually only a small amount of these hydrotropic substances is needed. For instance, when pyrazolones are used relatively small quantities are sufficient to obtain the desired effect. Dimethyl phenyl pyrazolone is typical of the water soluble pyrazolone compound and is quite effective for the present purposes. However, other non-albuminous organic nitrogen-containing compounds such as ureas, amids of lower fatty acids, etc., may be employed. The urea and acetamid employed in the illustrative examples given post are typical of such stabilizing agents.

Thus by the present invention, stable aqueous solutions of the alkali metal salts of barbituric acid are readily obtained. It is even now possible to produce such stable solutions from those alkali metal salts of barbituric acid which have heretofore spontaneously decomposed by hydrolysis when contacted with water. The aqueous solutions of the alkali metal salts of barbituric acids produced by the present invention being stable in storage and stabilized against hydrolysis of the alkali metal salt, are advantageous for producing solutions for injecting purposes.

*Example 1*

10 g. of the sodium salt of the methylpropyl-carbin-ethyl-barbituric acid of the formula

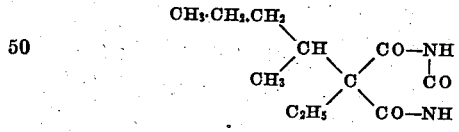

are dissolved in 105 g. of a 60 percent aqueous solution of urea. In a corresponding purely aqueous solution precipitation will take place immediately after the matter has been dissolved and the precipitation will continue after the deposit formed has been removed. In contrast hereto the solution obtained in the manner described above will remain clear and stable and may even be diluted with water without any deposit being formed.

*Example 2*

10.2 g. of isoamyl-ethylbarbituric acid are dissolved in 22.1 cm.³ of 2/n soda lye and the small residue of undissolved particles is filtered off. To the resulting fluid 83 g. of a 70 percent acetamido-solution are added. The end product is a clear, stable solution.

*Example 3*

20 g. of methylpropyl-carbin-ethyl-barbituric sodium are dissolved in 193 g. of a 20 percent solution of dimethylphenylpyrazolone in water. The product is a stable clear solution.

I claim:

1. As an improved method of preparing stable aqueous solutions of alkali metal salts of substituted barbituric acids, suitable for injection purposes, the process which comprises preparing an aqueous solution of said alkali metal salt having the said acid and alkali combined in substantially equi-molecular proportions and incorporating a non-albuminous, organic nitrogen-containing, hydrotropic substance with the aqueous solvent, said substance being water-soluble and capable of stabilizing the said alkali metal salt against hydrolysis by the aqueous solvent, sufficient stabilizing agent being incorporated to prevent any substantial development of free acid and alkali and to render the aqueous solution of said alkali metal salt stable in storage.

2. The process of claim 1 wherein said stable solution is obtained by dissolving the said alkali metal salt in an aqueous solution of the said stabilizing agent, sufficient stabilizing agent being present to prevent hydrolysis of the salt during the dissolving thereof.

3. The process of claim 1 wherein a sodium salt of an amyl-ethyl barbituric acid is dissolved in an aqueous solution containing a minor amount of a pyrazolone dissolved therein.

4. The process of claim 1 wherein the sodium salt of methyl-propyl-carbin-ethyl barbituric acid is dissolved in a 20 per cent aqueous solution of dimethyl-phenyl-pyrazolone.

5. The process of claim 1 wherein the said aqueous solution of the said alkali metal salt is prepared by adding an excess of the said barbituric acid to an aqueous solution of alkali lye containing insufficient alkali lye to dissolve all the acid and filtering off the undissolved, uncombined acid, to combine substantially all of the alkali with acid and wherein the said aqueous solution of alkali metal salt having the said acid and alkali combined in substantially equi-molecular proportions so obtained is then diluted with an aqueous solution of said hydrotropic substance to so introduce the stabilizing agent and stabilize the said alkali metal salt so formed.

6. In the preparation of aqueous solutions of alkali metal salts of substituted barbituric acids having the said acid and alkali combined in substantially equi-molecular proportions and suitable for injection, the improvement which comprises arresting the normal development of free acid and alkali by dissolving in the aqueous solvent a non-albuminous, organic nitrogen-containing hydrotropic agent capable of stabilizing the said alkali metal salt against hydrolysis by the aqueous solvent, sufficient stabilizing agent being so introduced to render the aqueous preparation stable in storage.

7. The improvement of claim 6 wherein said stabilizing agent is a water soluble pyrazolone compound.

8. The improvement of claim 6 wherein said stabilizing agent is dimethyl-phenyl-pyrazolone.

9. The improvement of claim 6 wherein the alkali metal salt so stabilized in aqueous solution is the sodium salt of methyl-propyl-carbin-ethyl barbituric acid.

10. The improvement of claim 6 wherein the alkali metal salt so stabilized in aqueous solution is a salt of an alkyl substituted barbituric acid having an alkyl group which contains at least 5 carbon atoms.

11. The improvement of claim 6 wherein the alkali metal salt so stabilized in aqueous solution is the sodium salt of isoamyl-ethyl barbituric acid.

12. As an improved medicinal preparation suitable for injection and stable in storage, a stable aqueous solution of an alkali metal salt of substituted barbituric acids having the said acid and alkali combined in substantially equimolecular proportions, said solution being substantially free of uncombined acid and alkali and also containing dissolved therein a non-albuminous, organic nitrogen-containing, hydrotropic, water-soluble substance capable of stabilizing the said alkali metal salt against hydrolysis by the aqueous solvent, sufficient of said stabilizing agent being present to prevent any substantial development of free acid and alkali and to render the said preparation stable in storage.

13. The improved preparation of claim 12 wherein said salt is the sodium salt of an alkyl substituted barbituric acid having an alkyl group which contains at least 5 carbon atoms.

14. The improved preparation of claim 12 wherein said stabilizing agent is a water-soluble pyrazolone compound.

15. The improved preparation of claim 12 wherein said stabilizing agent is dimethyl-phenyl pyrazolone.

16. The improved preparation of claim 12 which comprises the sodium salt of methylpropyl-carbin-ethyl-barbituric acid dissolved in an aqueous solution of dimethyl-phenyl pyrazolone.

17. The improved preparation of claim 12 wherein said stabilizing agent is acetamide.

18. The improved preparation of claim 12 which comprises the sodium salt of isoamyl-ethyl-barbituric acid dissolved in an aqueous solution of acetamide.

19. The improved preparation of claim 12 wherein said stabilizing agent is urea.

20. The improved preparation of claim 12 which comprises the sodium salt of methylpropyl-carbin-ethyl barbituric acid dissolved in an aqueous solution of urea.

HEINRICH GRUBER.